Figure 4:
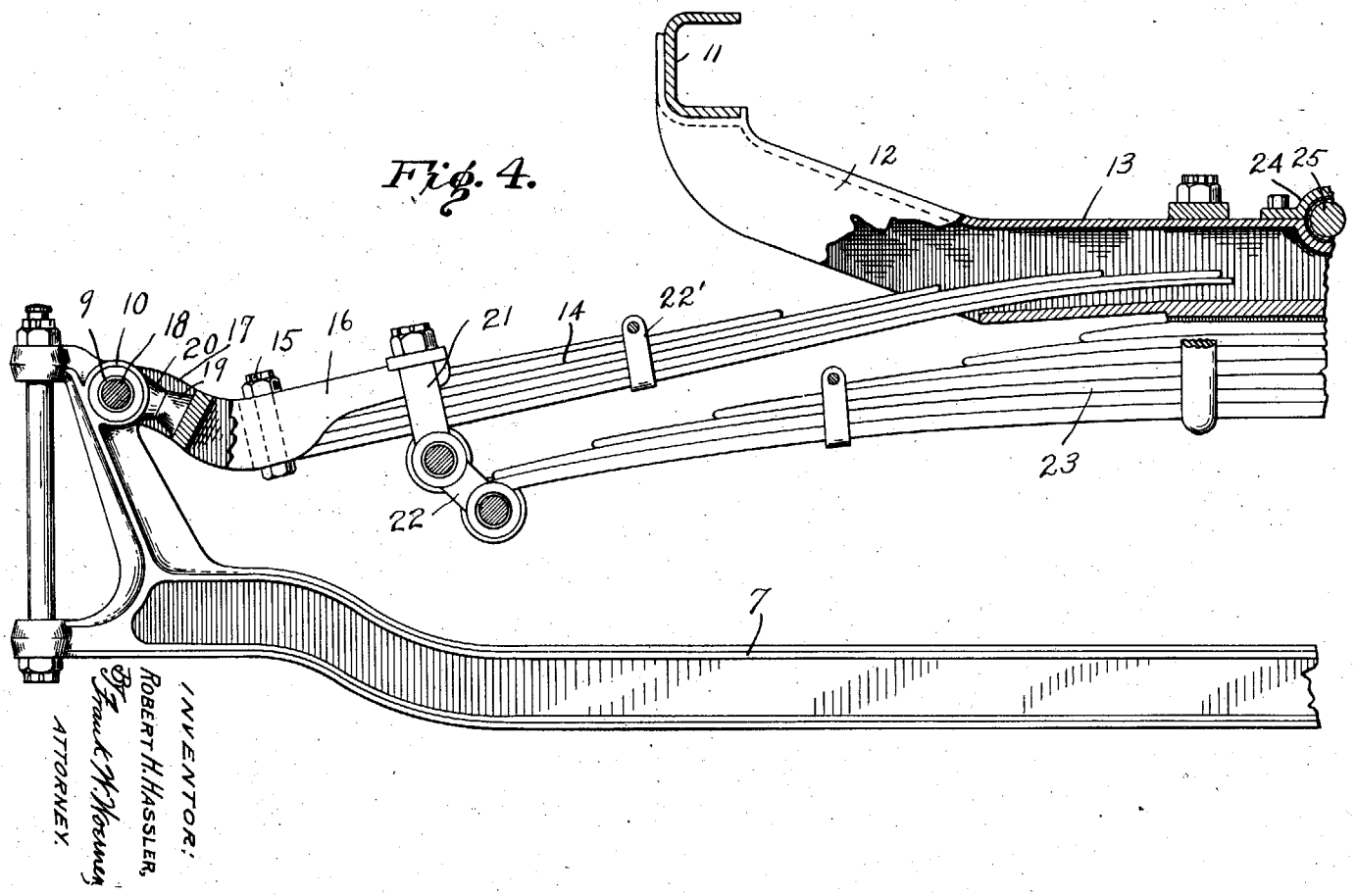

Sept. 18, 1923. Re. 15,686
R. H. HASSLER
SPRING SUSPENSION
Original Filed Oct. 2, 1915 3 Sheets-Sheet 1
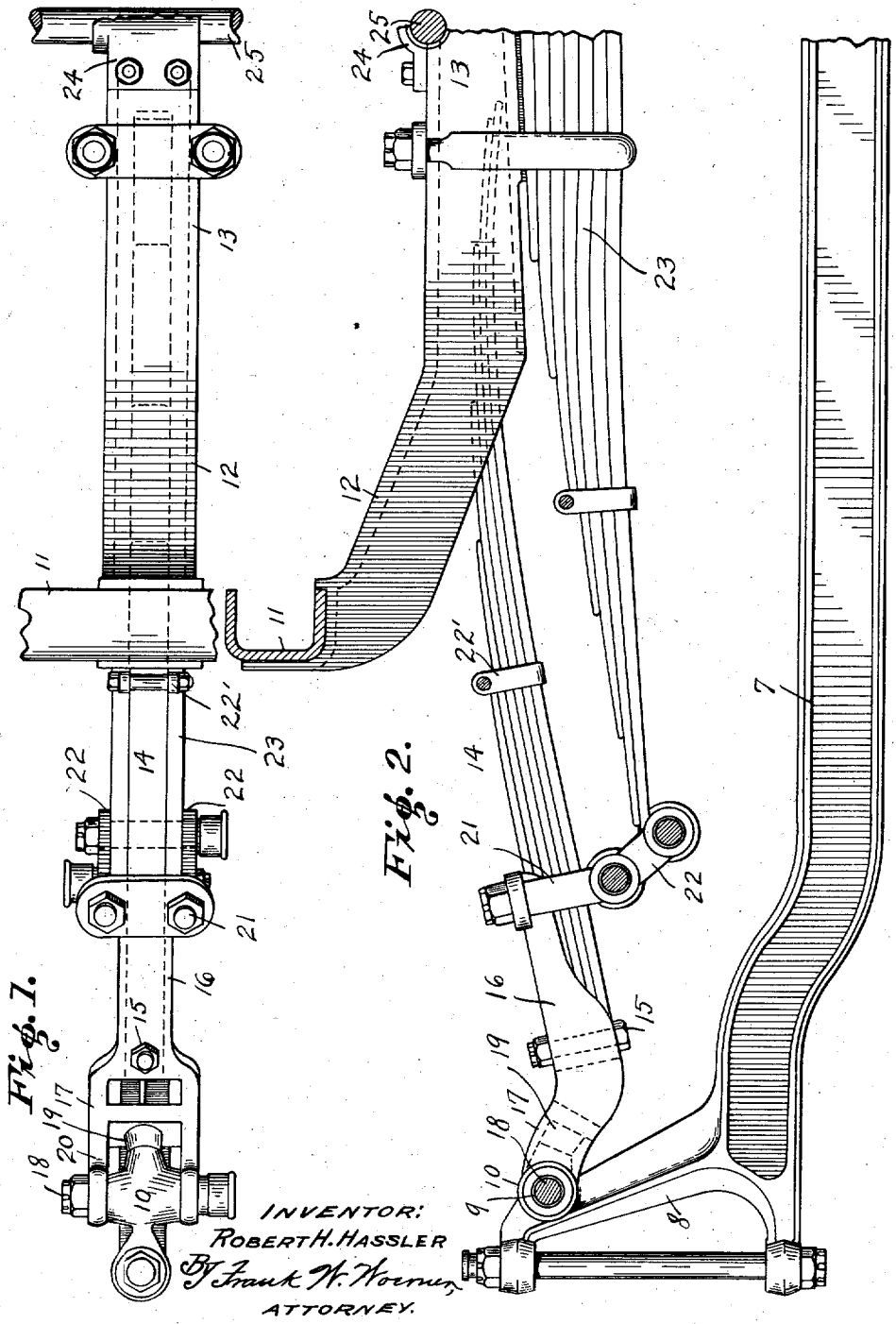

Sept. 18, 1923. Re. 15,686
R. H. HASSLER
SPRING SUSPENSION
Original Filed Oct. 2, 1915 3 Sheets-Sheet 2
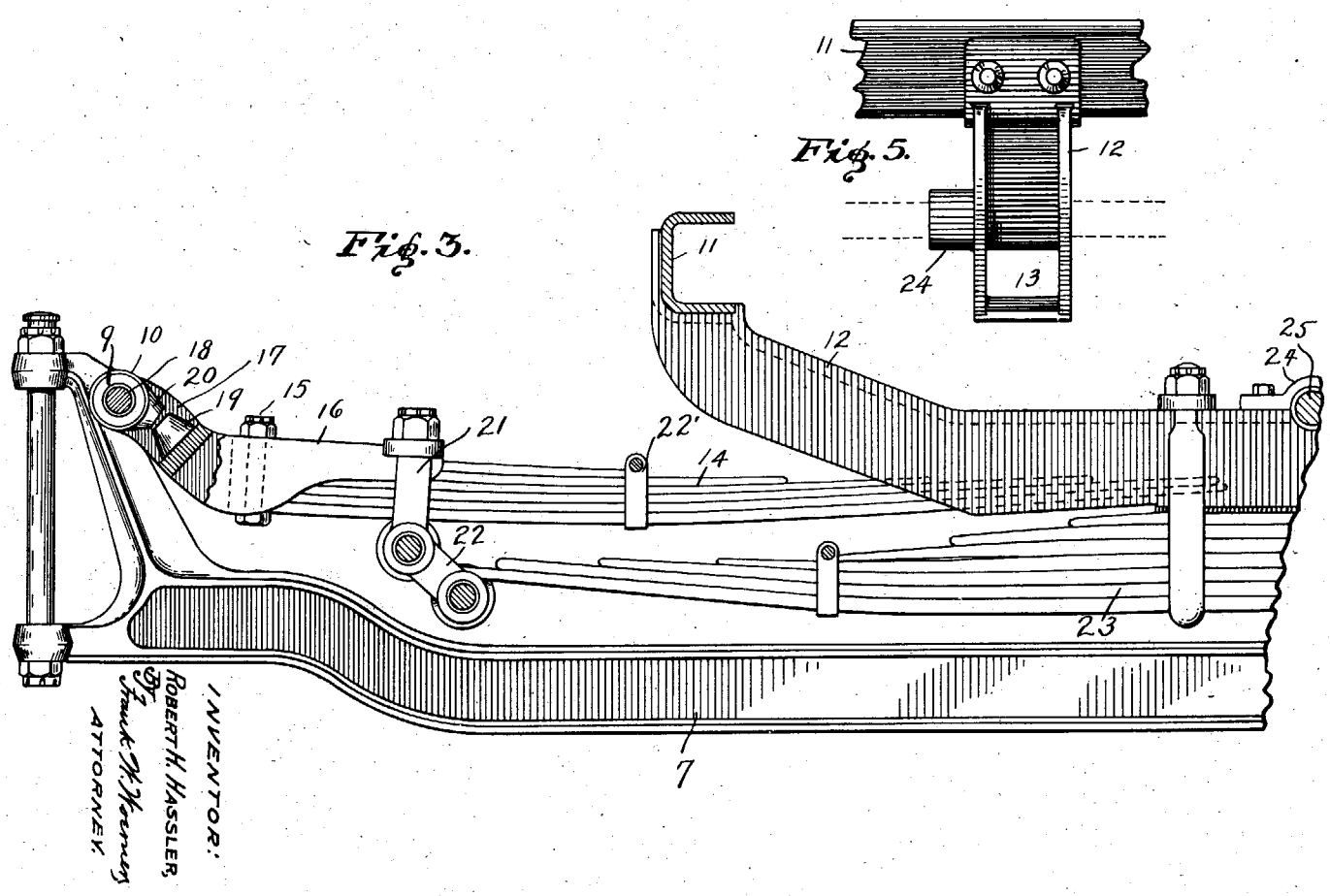

Sept. 18, 1923. Re. 15,686

R. H. HASSLER

SPRING SUSPENSION

Original Filed Oct. 2, 1915 3 Sheets-Sheet 3

INVENTOR:
ROBERT H. HASSLER,
By Frank W. Woerner,
ATTORNEY.

Reissued Sept. 18, 1923. Re. 15,686

UNITED STATES PATENT OFFICE.

ROBERT H. HASSLER, OF INDIANAPOLIS, INDIANA.

SPRING SUSPENSION.

Original No. 1,293,425, dated February 4, 1919, Serial No. 53,716, filed October 2, 1915. Application for reissue filed January 16, 1920. Serial No. 351,957.

*To all whom it may concern:*

Be it known that I, ROBERT H. HASSLER, a citizen of the United States, residing at Indianapolis, in the county of Marion and State of Indiana, have invented certain new and useful Improvements in Spring Suspension, of which the following is a specification.

It is desirable that the chassis or frame of an automobile which is the part carrying the load, be yieldingly and at the same time as positively supported on the axles and wheels as possible, consistent with the range of motion required for easy travel over irregular roads.

This invention relates to spring suspension for vehicles whereby a supplementary leaf spring is interposed between the axle-support and each end of a semi-elliptic spring which latter supports the main frame, and the object is to so combine and arrange the parts that the supplementary leaf springs will automatically shorten under heavy stresses and lengthen under lighter ones, thereby becoming stiffer and more resistant on the one hand, or more elastic and easier flexed, on the other hand, as the load conditions and the character of the road over which the vehicle is traveling may require in order to secure uniform easy riding conditions.

I accomplish the above and other objects which will hereinafter appear, by the mechanism illustrated in the accompanying drawings, in which—

Figure 1 is a top plan view of the left half of a front automobile axle with my invention operatively applied thereto. Fig. 2 is a front elevation of same, showing the parts in the positions which they assume under the conditions of a normal load on the frame. Fig. 3 is a like view of the same parts under the conditions of an overload. Fig. 4 is a like view of the same parts in the position of rebound when overloaded, showing the manner in which the supplementary leaf spring is shortened to increase the resistance, and Fig. 5 is an end view of the front transverse frame member showing how it is made hollow to receive the inner ends of the supplementary springs. Some of the parts are broken away in Figs. 3 and 4.

Like characters of reference indicate like parts throughout the several views of the drawings.

While I have selected the left half of a front automobile axle with which to illustrate my invention it will be understood that the same construction will be duplicated in a reverse order on the other side of the machine for the front axle, and that my invention will be duplicated for the rear axle by pivoting the supplementary springs to rear axle extensions provided for the purpose but equivalent in so far as this invention goes to the upper knuckle arms here shown on the front axle.

Referring to the drawings, 7 is the front axle of an automobile, having integral upward extensions 8, near each end, with transverse eyes 9 in heads 10 thereon, for the attachment of the spring-suspension of the automobile frame. The latter comprises longitudinal channel bars 11 and transverse cast members 12, having tubular middle portions 13 which are preferably lower than the bars 11, and are open at each end for the introduction therein of the inner ends of supplementary springs, 14. The latter are formed of a plurality of leaves of different lengths, which are arranged with their outer ends even. The leaves preferably taper toward their inner ends and are curved somewhat more than is shown in Fig. 2 when they are not stressed, as this view shows them under normal load, and therefore partly straightened. The outer ends of the leaves are provided with registering holes through which a bolt 15 is passed for the purpose of bolting them together and for fastening them as a whole to a shoe 16. The latter has depending parallel and longitudinal flanges between which the leaves of the supplementary spring make a close fit. The shoe terminates with a yoke 17 between the arms of which a head 10 is secured by a pivot-bolt 18. A cross-bar in the yoke has a lug 19 which contacts with a lug-extension 20 from the head 10, to limit the upward travel of the shoe and its supplementary spring. The leaf springs are bound to the inner end of the shoe by a clip 21, which also has a perforated head at its lower end to which a pair of link-bars 22 are pivoted. The leaves of the supplementary spring are additionally bound together by a clip 22′.

Secured to the under side of the tubular portion of the transverse frame-casting 12, is a semi-elliptic spring 23, the outer ends of which are suspended from the lower ends of the link-bars 22, as shown. The spring 23 is much larger and heavier and also stronger than the supplementary springs, and is designed to take care of most of the load which it will do except in cases of overload and on the rebound of normal loads, at which times the supplementary springs come into play with advantage as will be hereinafter more fully explained.

The front transverse frame casting 12 will differ from the one at the rear by forming a part of the engine-support, and will consequently be formed with a suitable bearing 24 for the engine shaft 25.

The operation of my invention is as follows: Under conditions of normal load, such as is illustrated in Fig. 2, it will be noted that the extreme inner ends of the supplementary springs are in contact with the floor or bottom of the tubular middle portion 13 of the transverse frame member 12, whereby, on account of the length of the supplementary springs in action they are assisting to support the load with their maximum resiliency. But under the stress of an overload the supplementary springs are straightened more as shown in Fig. 3, until approximately one-fourth of their lengths is in contact with the floor of tubular portion 13, thereby shortening the operative part of the spring to the extent of said contact, and bringing into play the larger and stiffer portions of them and thus materially aid in supporting the overload.

In this condition as illustrated in Fig. 3, the stop-lugs 19 and 20 are apart, but on the rebound after striking a road-obstruction, these lugs contact as shown in Fig. 4, limiting the upward swing of the supplementary springs on their pivots and causing their inner portions to contact with the outer ends of the floors of the tubular portion 13. By their own spring action the supplementary springs resist the upward movement of the rebound of the load, and reduce or absorb it gradually without permitting it to develop into a shock such as would otherwise be the result. The supplementary springs absorb the shock in the manner above described, proportionately of course for all kinds of loads, that is, for light, medium or heavy loads.

Obviously, changes in the details of construction may be made without departing from the spirit of the invention and I do not care to limit myself to any particular form or arrangement of parts.

I claim:—

1. In a vehicle, a support, a vehicle spring, a supplementary leaf spring pivoted to the support, and means for connecting an end of the vehicle spring with said supplementary leaf spring with the free end of the supplementary leaf spring supported in suspension above the vehicle spring, said supplementary leaf spring being formed to increase its range of contact with its means for suspension above the vehicle spring as the load is increased.

2. In a vehicle, a support, a vehicle spring, a supplementary leaf spring, and a shoe pivoted to said support to which shoe an end of the supplementary leaf spring is attached with the free end of the supplementary leaf spring supported in suspension above the vehicle spring, said supplementary leaf spring being formed to increase its range of contact with its means for suspension above the vehicle spring as the load is increased.

3. In a vehicle, a support, a vehicle spring, and a supplementary leaf spring pivoted to the support and to which supplementary leaf spring an end of the vehicle spring is attached with the free end of the supplementary leaf spring supported in suspension above the vehicle spring, the range of contact of the supplementary leaf spring with its means for suspension above the vehicle spring being increased for automatically reducing the resilient length and correspondingly increasing the strength of the supplementary leaf spring as the load is increased.

4. In a vehicle, a support, a vehicle spring connected at one end to the intermediate portion of a supplementary leaf spring, a supplementary leaf spring connected to said support with its free end supported in suspension over the vehicle spring, the range of contact of the supplementary leaf spring with its means for suspension over the vehicle spring being increased to correspondingly shorten the resilient length of the supplementary leaf spring as the load is increased, and means for limiting the upward travel of said supplementary leaf spring.

5. In a vehicle, an axle, a frame over the axle, a transverse member in the frame having an open end portion, a leaf spring rigidly fastened to said transverse member, and a supplementary leaf spring pivoted to the axle to which last spring an end of the first spring is jointed, the free end of the supplementary spring loosely entering the open end in said transverse member.

6. In a vehicle, an axle, a frame over the axle, a transverse member in the frame, a leaf spring fastened to said transverse member, a supplementary spring pivoted to the axle to which last spring an end of the first spring is jointed, means to limit the play of the supplementary spring on its pivot, and means to support the inner portion of the supplementary spring at different distances from its pivot to automatically vary its effective length.

7. In a vehicle, an axle, a frame over the axle, a transverse member in the frame, a leaf spring fastened to said transverse member, a supplementary leaf spring pivoted to the axle to which last spring an end of the first spring is jointed, means to limit the play of the supplementary spring on its pivot, and means to support the inner portion of the supplementary spring on said transverse frame member at different distances from its pivot by a variation in the shape of the spring under stress to automatically vary the effective length of said supplementary spring.

8. In a vehicle, an axle, a frame over the axle, a transverse member in the frame, a leaf spring rigidly secured to said transverse member, a supplementary leaf spring pivoted to the axle, an end of the first spring being jointed to this last spring, and means to support the inner portion of the supplementary spring at different distances from its pivot to vary its effective length.

9. In a vehicle, an axle, a frame over the axle, a transverse member in the frame, a leaf spring rigidly secured to said transverse member, a supplementary leaf spring pivoted to the axle, an end of the first spring being jointed to this last spring, means to support the inner portion of the supplementary spring, and means to vary the shape of the supplementary spring under stress to cause its inner portion to bear upon said support at different distances from the pivotal point of said supplementary lever to vary its effective length.

10. In a vehicle, an axle, a frame over the axle, a transverse member in the frame having an engine-supporting member and a tubular portion thereunder, a leaf spring rigidly fastened to said transverse member, a supplementary leaf spring pivoted to the axle, means to limit the swing of the supplementary spring on its pivot away from the axle, an end of the first spring being jointed to the supplementary spring and the inner end of the latter loosely entering the tubular portion of the transverse frame member.

11. In a vehicle, an axle, a frame over the axle, a transverse member in the frame having a spring-bearing plate longitudinally of its middle portion, a leaf spring rigidly fastened to said transverse member, a supplementary leaf spring pivoted to the axle, links pivotally connecting the supplementary spring with an end of the first leaf spring, the free end of the supplementary spring having its bearing upon said spring-bearing plate of the transverse frame member, said axle and supplementary spring having portions which contact with each other to limit the swing of the supplementary spring away from the axle.

12. A shock absorber comprising the combination with a vehicle axle and spring, of a bracket pivotally connected with said axle, a leaf spring secured at one end to said bracket and extending in a plane substantially parallel to said axle with its opposite end supported in suspension above the vehicle spring, and a link pivotally connected with the bracket and with the free end of the vehicle spring.

13. In a spring suspension for vehicle bodies, the combination of an axle assembly, a main spring, a lever member having its outer end pivotally supported on the axle assembly and its inner end supported by the vehicle body non-yieldingly with respect to downward movement relative to the point of support, said lever member having a resilient part intermediate its ends, and means connecting an end of the main spring to the resilient part of the lever member.

14. In a spring suspension for vehicle bodies, the combination of an axle assembly, a main spring, a lever supported at its ends by the axle assembly and the vehicle body rockingly and non-yieldingly with respect to downward movement relative to the points of support, said lever comprising an elastic portion intermediate said end supports, and means connecting an end of the main spring to the lever, whereby the former is flexibly supported with respect to the ends of the lever.

15. In a spring suspension for vehicle bodies, the combination of an axle assembly, a main spring, a supplemental leaf spring pivotally supported at its outer end by the axle assembly and supported at its inner end by the vehicle body non-yieldingly with respect to downward movement relative to the point of support, and means connecting an end of the main spring to the supplemental leaf spring intermediate the ends of the latter.

ROBERT H. HASSLER.